Patented Feb. 22, 1927.

1,618,397

UNITED STATES PATENT OFFICE.

PHILIP S. WILLIAMS, OF McKITTRICK, CALIFORNIA, ASSIGNOR, BY MESNE ASSIGNMENTS, TO STANDARD OIL COMPANY OF CALIFORNIA, OF SAN FRANCISCO, CALIFORNIA, A CORPORATION OF DELAWARE.

RESISTANT SUBSTANCE.

No Drawing. Application filed November 4, 1924. Serial No. 747,826.

This invention relates to a substance which may be used in various connections as a cement, or caulking material for closing seams between plates. The invention is particularly useful when employed as a cement or caulking material for closing the roof seams of storage tanks for petroleum. The seams of such tanks should be made as nearly gas-tight as possible in order to reduce the hazards from fire and loss by evaporation which might be occasioned by leakage through the seams. On account of the changes in temperature and changes in the internal pressure, as well as on account of strains due to the wind, the plates of such tanks at the seams tend to "work" or move considerably upon each other and this increases the difficulty of rendering such seams tight by the use of ordinary means. The general object of this invention is to provide a substance which may be applied to such seams and cracks so as to seal them effectively while at the same time being capable of resisting the action of gasoline vapor from the inside of the tank and the action of weather from without; also to provide a substance of this kind which can be applied without the use of metal caulking tools involving the danger from striking sparks accidentally, and which can be applied without the use of heat; and one of the objects of the invention is to produce a substance of this kind which will remain elastic and which will not crack from stresses caused by variations in the temperature, or by "working" or movements of the plates forming a seam.

Further objects of the invention will appear hereinafter.

The invention consists in the novel ingredients and combination of ingredients to be described hereinafter, all of which contribute to produce an efficient resistant substance.

In practicing my invention I prefer to employ a mixture of mineral fibrous material, a binding material, a hardening substance, and a thinning substance.

The mineral fibrous material should be in a finely divided state. As a mineral fibrous material I prefer to employ finely ground asbestos, and the binding material is preferably a vegetable binding material such as pine tar; as a hardening substance I prefer to employ a substance of the nature of shellac; as a thinning substance I employ a volatile solvent such as alcohol. In other words, the alcohol is a solvent at atmospheric temperatures. Hence the mixture can be made and applied without using heat.

The above indicated ingredients may be used in substantially the following proportions: 25 lbs. pine tar, 30 lbs. ground asbestos, 25 lbs. shellac, 2½ gals. denatured alcohol.

The mixture should be sufficiently viscous to enable it to be readily introduced into the seams, and so that it will remain in place. When the alcohol evaporates, the substance will form an elastic seal within the seam which will adapt itself to movements of the plates forming the seam and at the same time it will resist the action of the weather and will not be affected by the action of gasoline vapors within the tank.

It is understood that the embodiment of the invention described herein is only one of the many embodiments this invention may take, and I do not wish to be limited in the practice of the invention, nor in the claims, to the particular embodiment set forth.

What I claim is:—

1. A material to be used for closing the seams of gasoline tanks, consisting of a gasoline resistant elastic substance having as ingredients, a mineral fibrous material, a binding material, a hardening substance, and a volatile solvent for the hardening substance operating as a solvent for the same at atmospheric temperatures, the elasticity of said resistant substance operating to accommodate movements of the plates at the seams.

2. A material to be used for closing the seams of gasoline tanks, consisting of a gasoline resistant elastic substance composed of a mixture of asbestos in a finely divided state, shellac and alcohol, and a sufficient quantity of pine tar to plasticize the shellac, the elasticity of said resistant substance operating to accommodate the movements of the plates at the seams, and alcohol operating as a solvent for the shellac at atmospheric temperatures.

3. A gasoline resistant substance to be used as a cement, consisting of a mixture of substantially 25 pounds of pine tar, 30 pounds of finely divided asbestos, 25 pounds of shellac, and 2½ gallons of alcohol, substantially as described.

4. A gasoline resistant cement, comprising a mixture of substantially 25 pounds of pine tar, 30 pounds of finely divided asbestos and 25 pounds of shellac.

Signed at Bakersfield, Cal., this 10th day of October, 1924.

PHILIP S. WILLIAMS